United States Patent [19]

Blake

[11] 3,998,111
[45] Dec. 21, 1976

[54] FLUID CIRCUIT FOR SHIFTING A TRANSMISSION
[75] Inventor: William W. Blake, Kewanee, Ill.
[73] Assignee: Caterpillar Tractor Co., Peoria, Ill.
[22] Filed: Mar. 24, 1975
[21] Appl. No.: 561,757
[52] U.S. Cl. .............................. 74/752 C; 91/413; 137/505.14; 137/625.68; 192/4 A
[51] Int. Cl.² ...................... F16H 3/74; F16H 57/10
[58] Field of Search .................. 91/411 R, 413; 74/752 C; 137/505.14, 625.68; 192/4 A

[56] References Cited
UNITED STATES PATENTS

| | | | |
|---|---|---|---|
| 2,919,603 | 1/1960 | Livemore | 192/4 A X |
| 3,091,976 | 6/1963 | Johnson | 74/364 |
| 3,181,394 | 5/1965 | Ramsel | 74/754 |
| 3,198,027 | 8/1965 | Ramsel | 74/364 |
| 3,217,726 | 11/1965 | Rohweder | 137/101 |
| 3,386,540 | 6/1968 | Horsch | 192/.09 |
| 3,444,762 | 5/1969 | Golan | 74/754 |
| 3,468,194 | 9/1969 | Horsch | 74/753 |
| 3,481,435 | 12/1969 | Pearce | 192/4 |
| 3,583,422 | 6/1971 | Dach | 137/505.14 X |
| 3,596,536 | 8/1971 | Starling | 74/753 |
| 3,625,322 | 12/1971 | Nagamatsu | 74/752 C |
| 3,709,065 | 1/1973 | Starling | 74/753 |
| 3,729,171 | 4/1973 | Yates | 192/4 A |

Primary Examiner—Martin P. Schwadron
Assistant Examiner—Abraham Hershkovitz
Attorney, Agent, or Firm—Phillips, Moore, Weissenberger, Lempio & Strabala

[57] ABSTRACT

A hydraulic system responsive to movement of a shift lever energizes selected pairs of drive engaging devices in a vehicle transmission by applying a gradual rise in pressure to the selected speed drive engaging device and by applying a delayed and a lesser gradual pressure rise to a selected directional drive engaging device. The circuit neutralizes the transmission by blocking fluid pressure from at least one of the devices if the vehicle engine is started with the shift lever at a position other than neutral and also neutralizes the transmission when the vehicle brakes are applied while still maintaining full fluid pressure to other vehicle components. These functions are accomplished by a combination of a pair of selector valves, a pressure modulation valve assembly and a greatly simplified and compact spool differential check and safety valve.

6 Claims, 5 Drawing Figures

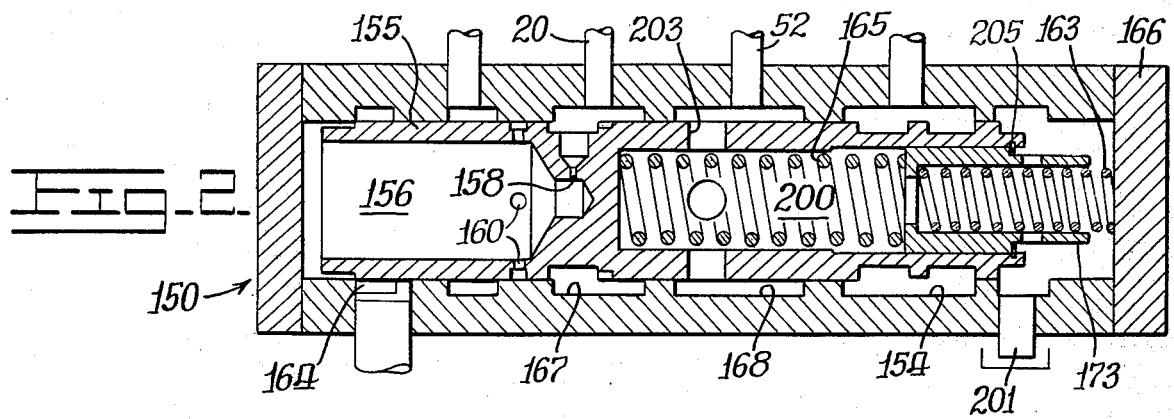
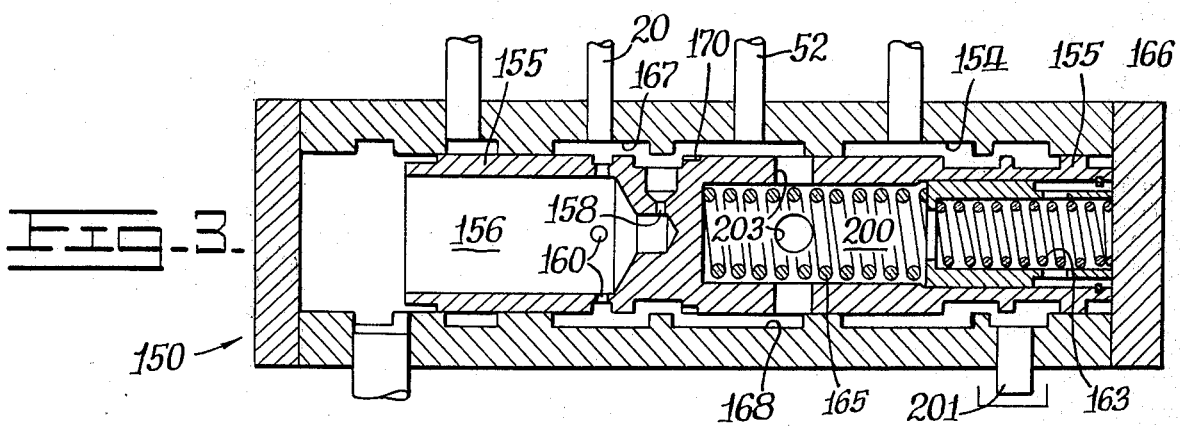
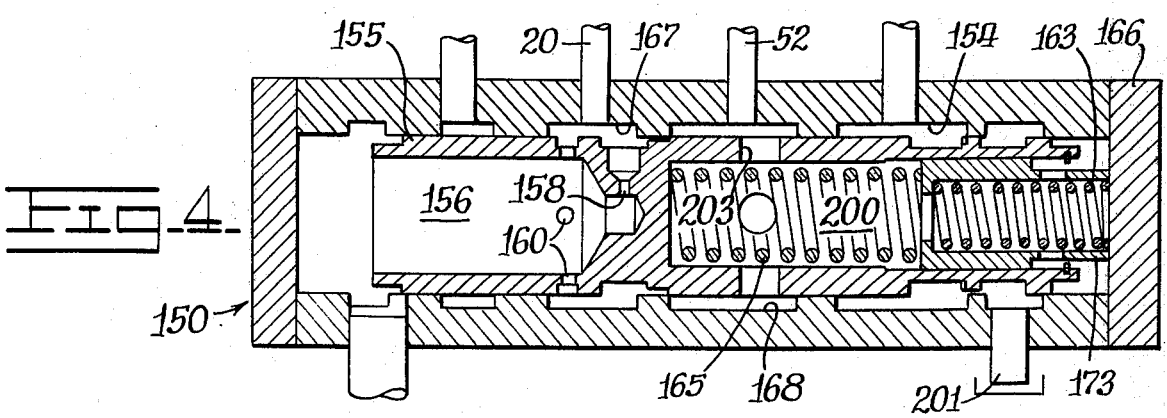
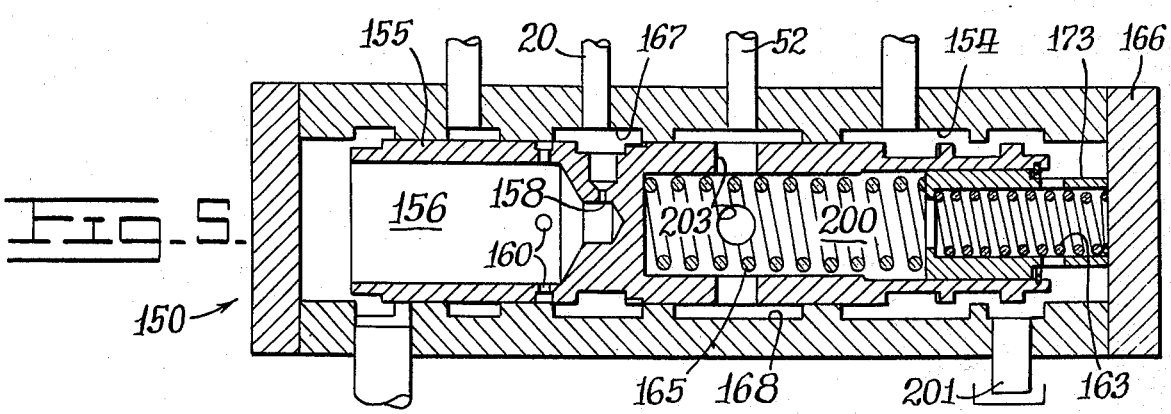

FLUID CIRCUIT FOR SHIFTING A TRANSMISSION

BACKGROUND OF THE INVENTION

This invention relates to multi-speed transmissions, in particular, transmissions having drive engaging devices energized by fluid pressure, and more particularly to the fluid circuits for energizing such drive engaging devices in response to the operator's selection of a desired speed and directional drive engaging device.

Certain forms of vehicle transmissions utilize clutches or brakes to activate each selected drive ratio for the selected drive direction. To avoid shocks and reduce stress and wear the control system is arranged to apply fluid pressure to the selected directional drive engaging device or selected speed drive engaging device in a gradual or modulated manner. Normally, one of the drive engaging devices, usually the directional device, is made larger and more wear resistant. The control system is designed to attain operating pressure in the larger and more wear resistant engaging device subsequent to reaching operating pressure in the smaller device. This insures that the higher capacity device is the one which sustains the shock of reestablishing torque flow from the engine through the transmission to the drive shaft.

In order to reduce shocks to the transmission, and primarily for safety reasons, the control systems are usually designed to provide still further functions. These further functions include automatic blocking of pressure from the directional drive engaging device in the event the engine is started up while the shift lever is at a position other than neutral. Furthermore, it is desirable to provide for automatic neutralization of the transmission when the vehicle brakes are applied, thereby reducing wear on the transmission.

Prior transmission control systems of the general type under discussion are disclosed, for example, in U.S. Pat. Nos. 3,091,976; 3,181,394; 3,198,027; 3,217,726; 3,386,540; 3,444,762; 3,468,194; 3,481,435 and 3,596,536. U.S. Pat. application Ser. No. 373,246, now Pat. No. 3,863,523 assigned to the assignee of this invention, also shows a hydraulic control system of the type under discussion in this application. In order to realize the system functions discussed above, it has been necessary to complicate these systems with separable valving components for such purposes as sensing when the transmission control lever is in neutral, forcing neutralized condition of the transmission in response to fluid signals from other vehicle components such as the brakes and for maintaining fluid pressure while the system is so neutralized.

U.S. Pat. No. 3,709,065 shows a simplified version of this type of transmission control system. U.S. Pat. application Ser. No. 421,065, now U.S. Pat. No. 3,882,738 assigned to the assignee of this invention is an improvement on the system of U.S. Pat. No. 3,709,065 wherein the check valve function is included in the function of the safety differential valve spool. These previous patents and applications have suffered the disability of not providing sufficient fluid flow in large volume clutches thereby increasing torque interruptions during speed changes. Further, in this prior art, fluid flow in the differential check and safety valve has been restricted by complex porting systems in valve spools, such porting systems increasing the cost of manufacturing by requiring difficult machining processes either on the valve spool or in the valve housing itself. Simplification was possible in the differential check and safety valve by extending the length of the spool and housing but such lengthening was not considered desirable.

SUMMARY OF THE INVENTION

It is accordingly an object of this invention to provide, in a hydraulic control system for vehicle transmissions utilizing clutches or brakes as drive engaging devices, means for providing full pressure to such clutches or brakes under all operating conditions of the transmission.

It is a further object of this invention to provide a hydraulic control system for vehicle transmissions which while fulfilling the above object provides an increased fluid flow to such drive engaging devices without increasing the size of the various components.

It is still a further object of this invention to provide a hydraulic control system for a vehicle transmission which while fulfilling the above objects provides a lower operating pressure for the selected directional drive engaging device than the selected speed engaging device.

It is a still further object of this invention to provide neutralization of the transmission on a start up of the vehicle engine notwithstanding the positioning of the transmission control lever by the operator.

It is a still further object of this invention to provide a hydraulic control system for a vehicle transmission which while fulfilling the above objects provides for forced neutralization of the transmission in response to an external signal such as a braking signal while maintaining relatively high fluid pressure upstream of the control system during such neutralized condition.

It is a still further object of this invention to provide the above functions in a compact transmission control system while reducing the cost of manufacture by utilizing simply machined parts.

Broadly stated, the invention is a hydraulic control system for shifting a multi-speed transmission comprising a source of fluid pressure, a directional valve for selectively energizing one of a plurality of directional drive engaging devices; a speed valve means for selectively energizing by fluid pressure communicated from the directional valve at least one of a plurality of speed drive engaging devices; modulating means for providing gradual rises in fluid pressure to the selected speed and directional drive engaging devices; and a differential check and safety valve. The differential check and safety valve comprises a housing defining a bore with a spool member slidably contained therein. The spool member has a first axial bore and a second axial bore in the first and second end respectively with a sleeve member slidably contained in the first axial bore. The sleeve member has a cylindrical projection extending beyond the end of the spool member. The spool member is urged in a first direction to a first position by a first and second resilient means. The first resilient means is positioned in the first axial bore urging the sleeve member in a second opposite direction. The second resilient means, being of relatively lesser strength, engages the sleeve member at one end, and the housing at the other end, and urges the sleeve member in the first direction. The housing defines a first and second inlet groove, the second inlet groove communicating with the modulating means; a first and second outlet groove, the first outlet groove interposed between the first and second inlet grooves and communicating through the directional valve to one of the drive engaging devices, the second outlet groove positioned on the other side of the first inlet groove from the first outlet groove and vented through the directional valve means when the directional valve has energized one of the drive engaging devices. The housing also defines a first drain groove located between the second inlet groove and the end of the housing. The spool member defines radial ports communicating the first axial bore with the first outlet groove. The spool member when urged to the first position engages the end of the housing nearest the second outlet and blocks the second inlet. While in the first position, passage means in the spool member provide communication from the first inlet groove to the second axial bore, radial passages of larger dimension than the passage means communicate the second axial bore to the second outlet groove.

Means are provided to urge the spool member toward a second position wherein a first cavity is formed by closing the second outlet groove thus causing the sleeve member to engage the end of the housing which closes the first axial bore from the first drain groove.

BRIEF DESCRIPTION OF THE DRAWING

These and other objects of the invention will become apparent from a study of the following specification and drawings, in which:

FIG. 2 is a sectional view of the differential, check and safety valve shown in FIG. 1 after receipt of a neutralization signal.

FIG. 3 is a sectional view of the differential check and safety valve at the end of a directional drive engaging device fill cycle and the beginning of a pressurization cycle wherein the spool is moved against the cover.

FIG. 4 is a sectional view of the differential check and safety valve at a normal operating position with the selected speed and directional drive engaging devices filled and pressurized.

FIG. 5 is a sectional view of the differential check and safety valve immediately following selection of a new speed drive engaging device.

DETAILED DESCRIPTION OF PREFERRED EMBODIMENTS

Figure 1:
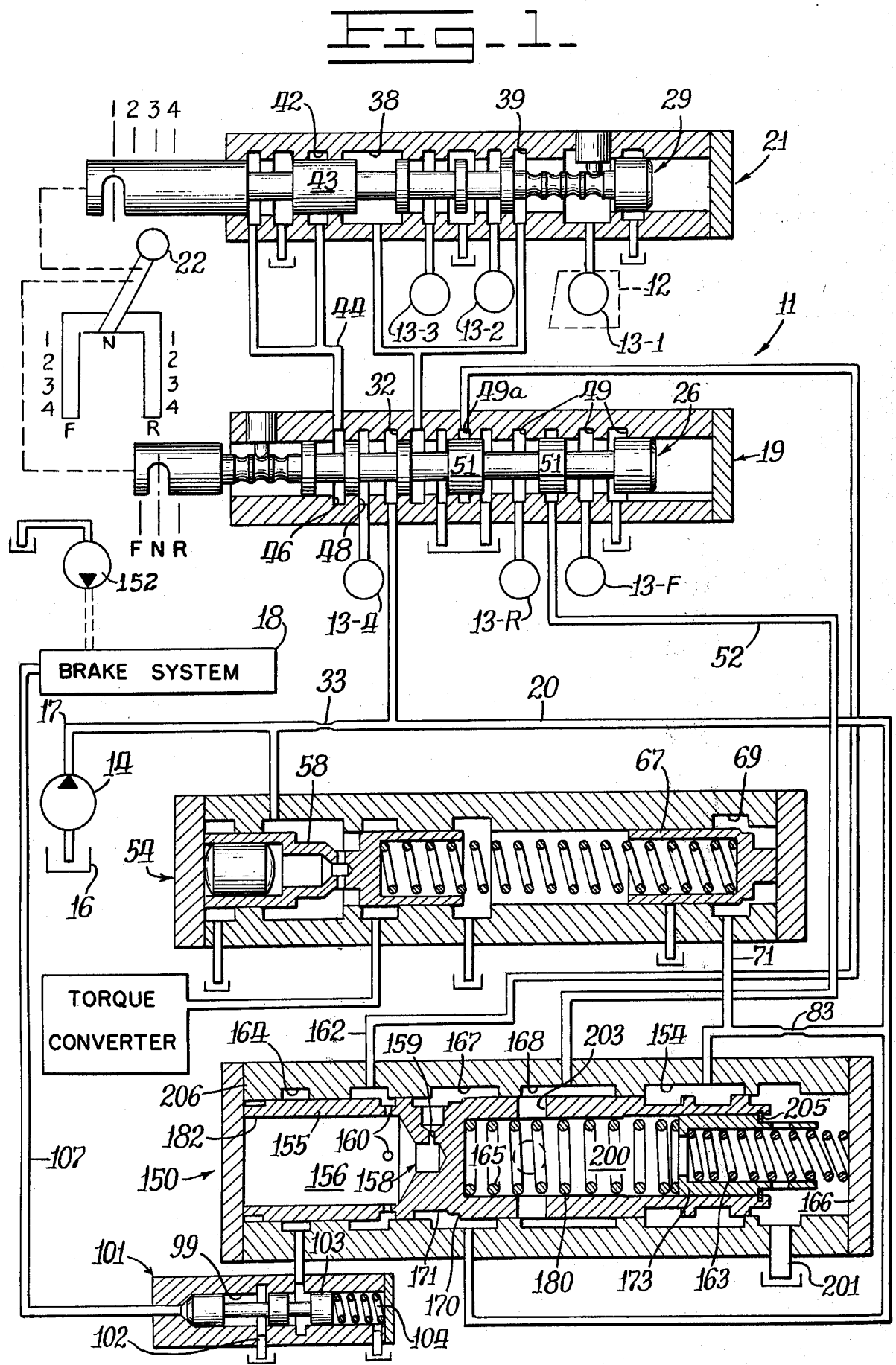
FIG. 1 illustrates a transmission control system embodying the invention with certain components being shown in section and certain other components being shown diagrammatically and with all elements being in the positions occupied when the system is shut down with no fluid pressure being supplied thereto, and the differential, check and safety valve shown in the safety position.

Referring to FIG. 1 of the drawings, a control system 11 is shown adapted to control a vehicle transmission 12 of the kind which includes a series of fluid pressure actuated drive engaging devices 13, which may be either clutches or brakes, wherein pressurization of selected combinations of the devices 13 enables a plurality of drive ratios, and provides for either forward or reverse drive through the transmission. Both the transmission 12 and devices 13 are shown schematically in FIG. 1 since such transmissions and drive engaging devices are well-known to the art. In the usual form, devices 13 are separable into directional drive engaging devices determining direction of the vehicle and speed drive engaging devices determining the gear ratio used. In this particular invention, the speed drive engaging devices are 13-1, 13-2, 13-3 and 13-4. Directional drive engaging devices are shown as 13-R and 13-F.

To select a particular speed drive engaging device and a particular directional drive engaging device the operator positions control lever 22 which moves spool 29 in speed valve 21 to the desired gear ratio, and simultaneously moves spool 26 in directional valve 19 to the desired direction. Upon positioning of spool 29 and spool 26, fluid pressure is applied to the particular speed drive engaging device and directional drive engaging device.

Fluid pressure for actuating these devices is obtained from reservoir 16 pressurized by engine driven pump 14 and delivered to conduit 17. A separate pump 152 also driven by the engine may be utilized to provide fluid pressure to the vehicle brake system 18. Other components utilizing fluid pressure may be connected to conduit 17.

Fluid pressure is supplied to conduit 17 and thence to the modulating valve 54. Simultaneously, fluid pressure is supplied to conduit 20 through restriction 33 and thence to directional valve 19 and differential, check and safety valve 150.

Fluid pressure from conduit 20 is applied to directional valve 19 at groove 32. When spool 26 of directional valve 19 is in the neutral position, such fluid pressure is directed to speed drive engaging device 13-4 through groove 48, however, land 51 of spool 26 in directional valve 19 has blocked the application of fluid pressure from conduit 52 to directional drive engaging devices 13-R and 13-F thereby preventing movement of the vehicle. Application of fluid pressure to devices 13-R and 13-F will be discussed subsequently. Selection of a speed drive engaging device by movement of control lever 22 simultaneously moves spool 26 from the neutral position illustrated in FIG. 1 such that fluid pressure is provided to speed valve 21 at groove 38 and groove 39. Fluid pressure is then directed to the appropriate selected speed drive engaging device 13-1, 13-2, or 13-3, as appropriate. Fluid pressure is directed to speed drive engaging device 13-4 when land 43 in speed valve 21 opens groove 38 to groove 42 thereby permitting passage of fluid pressure through conduit 44 to groove 46 and groove 48 of directional valve 19 and thence to speed drive engaging device 13-4. It will be readily seen in FIG. 1 that selection of a particular speed drive engaging device by positioning spool 29 of speed valve 21 will cause the remaining speed drive engaging devices to be vented.

Fluid pressure admitted to conduit 20 is directed to differential check and safety valve 150 at two locations of housing 206 of differential check and safety valve 150. Primarily, pressure is directed to groove 167 and secondarily, fluid pressure is delivered through restriction 83 to groove 154 of differential check and safety valve 150. Fluid pressure delivered through restriction 83 is also delivered to conduit 71 and thence to load piston chamber 69 of modulation valve 54. Fluid pressure delivered to groove 154 is blocked from drain 201 by a spool 155 when directional check and safety valve 150 is in the neutral position shown in FIG. 1. Fluid pressure delivered through conduit 20 to groove 167 of differential check and safety valve 150 is further directed through a passage means 158 comprised of orificed radial passage 159 to axial chamber 156 formed by axial bore 182 in spool 155. Such pressure is further communicated through radial passages 160 to conduit 162 and thence to groove 49A in directional valve 19.

When spool 26 is in any position other than the neutral position, such fluid pressure delivered to groove 49A is vented to drain. With spool 155 in directional check and safety valve 150 in the safety position, shown in FIG. 1, groove 168, which communicates fluid pressure with either directional drive engaging device 13R or 13F depending upon the position of spool 26, is blocked from communication with fluid pressure in groove 167 thereby preventing transmission of torque from the vehicle engine to the vehicle drive shaft. Furthermore, any pressure accumulated in devices 13R or 13F with spool 26 out of the neutral position will be vented to drain 201 through radial ports 203 and axial chamber 200.

Spool 155 is urged leftwardly to this neutral position by resilient means 165 acting in combination with resilient means 163, thereby insuring devices 13R and 13F are not energized until spool 26 of directional valve 19 is returned to the neutral position after starting.

Upon positioning of spool 26 to the neutral position either prior to or subsequent to engine start up, venting of conduit 162 is blocked by land 51 of spool 26 in directional valve 19 thereby permitting a pressure build-up in axial chamber 156 of differential check and safety valve 150. Such build up of pressure in axial chamber 156 urges spool 155 rightwardly against resilient means 165 and 163. Such rightward movement blocks radial passages 160 from communication to conduit 162. Further rightward movement opens radial passages 160 for the direct admission of pressure from groove 167 to axial chamber 156 thereby increasing the rate of movement of spool 155. Such communication provides fill through conduit 52 and subsequently selected engaging device 13-R or 13-F. Simultaneously, load piston chamber 69 of modulation valve 54 communicating through conduit 71 to groove 154 is initially vented to drain passage 201. Such rightward movement causes sleeve 173 to contact end 166 of housing 206 of differential check and safety valve 150 thereby closing axial chamber 200 from drain 201. It will be seen from FIG. 1 that sleeve 173 is retained within axial bore 180 of spool 155 by retaining ring 205. Resilient means 163 being of relatively lesser capacity than resilient means 165 insures that sleeve 173 will remain in its extended position as illustrated in FIG. 1 until contact is made with end 166. Utilization of this sleeve 173 within spool 155 provides a differential check and safety valve of shorter overall length than would be required if spool 155 were made of one piece. Continuing increase in pressure in axial chamber 156 urges spool 155 further to the right until spool 155 contacts end 166 of differential check and safety valve 150 as illustrated in FIG. 3. In this position, fluid pressure admitted to groove 167 is communicated directly to groove 168 and thence through conduit 52 to the selected directional drive engaging device 13-R or 13-F as selected by spool 26 of directional valve 19. Fluid pressure is also admitted to axial chamber 200 through radial ports 203 thereby causing a fluid pressure build-up in chamber 200 and consequently reversing movement of spool 155. Movement of spool 155 in such leftward direction continues until the operating position illustrated in FIG. 4 is reached, when pressure in axial chamber 156 equals pressure in chamber 200 augmented by resilient means 165 and 163.

When spool 155 is in the operating position as illustrated in FIG. 4, fluid pressure admitted to groove 167 is metered to groove 168 and chamber 200 around metering shoulder 170 of metering groove 171. Resilient means 165 and resilient means 163 augmented by fluid pressure in chamber 200 and opposing fluid pressure in chamber 156 result in a predetermined pressure differential between groove 167 and groove 168. In this operating position as shown in FIG. 4, groove 154 is blocked from drain 201, thereby causing a pressure build-up in load piston chamber 69. Such pressure build-up in load piston chamber 69 of modulating valve 54 results in a leftward movement of piston 67 and consequent leftward movement of spool member 58, both of modulating valve 54, causing a gradual increase in system pressures, pressure in device 13-R or 13-F being less than the pressure in the selected speed device because of the aforesaid pressure differential.

Selection of the different speed drive engaging device results in a loss of pressure in conduit 20 as the new speed drive engaging device is filled with fluid pressure. Such loss in pressure in conduit 20 results in a further leftward movement of spool 155 as illustrated in FIG. 5. Such leftward movement vents groove 154 to drain 201 thereby resetting load piston 67 of modulation valve 54 to the position shown in FIG. 1. Sleeve 173 may momentarily become unseated from end 166 of differential check and safety valve 150 thereby venting some pressure from groove 168 and disengaging but not draining selected device 13-R or 13-F. As pressure increases in conduit 20, fluid pressure admitted to chamber 156 via passage means 158 again urges spool 155 rightwardly and thence through the cycle described above.

Application of the vehicle brakes system causes an increase of pressure in conduit 107 forcing spool 103 rightwardly in brake signal housing 101. Such rightward movement of spool 103 vents groove 164 of differential check and safety valve 150 to drain 102 through bore 99. Venting of groove 164 when spool 155 of differential check and safety valve 150 is in any position other than the safety or first position causes a sudden drop in pressure in chamber 156. Such sudden drop of pressure in chamber 156 will cause spool 155 to be urged leftwardly by resilient means 165 acting in combination with resilient means 163. Such movement to the left of spool 155 to the position shown in FIG. 2 vents groove 168 through axial chamber 200 around the end of sleeve 173 to drain groove 201. During the leftward movement of spool 155, load chamber 69 of modulating valve 54 is also vented through groove 154 around land 175 to drain passage 201. Such venting of groove 168 and load pressure chamber 69 deenergizes both the speed and directional drive engaging devices. When the brakes are released, pressure drops in conduit 107 thereby causing spool 103 to be urged leftwardly by resilient means 104 closing groove 164 from drain passage 102. Pressure is again built up in axial chamber 156 by fluid passing from conduit 20 through groove 167 and radial passage means 158. Such build-up of pressure in chamber 156 causes a new cycle of pressure build-up in the appropriate speed drive engaging and directional drive engaging devices as set forth above.

Selection of a different directional drive engaging device by movement of spool 20 in directional valve 19 results in a drop in pressure in axial chamber 200 because of the requirement to fill the newly selected drive engaging device. Fluid pressure in chamber 156 now being greater than pressure in chamber 200 urges spool 155 rightwardly to the position shown in FIG. 3. Such movement from an operating position as shown in FIG. 4 to the position shown in FIG. 3 results in load chamber pressure 69 being vented to drain 201 and simultaneously opens groove 167 to direct communication with groove 168 and thence via conduit 52 to groove 49 of directional valve 19 and thence to the selected directional drive engaging device. Pressure build-up in chamber 200 subsequent to the filling of the selected direction engaging device, again urges spool 155 leftwardly to the position shown in FIG. 4, the pressurization of the system following as described above.

What is claimed is:

1. A hydraulic transmission control system for shifting a multi-speed transmission having a plurality of directional drive engaging devices and a plurality of speed engaging devices comprising:

A source of fluid pressure;
   directional valve means for selectively energizing by fluid pressure one of a plurality of directional drive engaging devices;
   speed valve means for selectively energizing by fluid pressure communicated from the directional valve means at least one of a plurality of speed drive engaging devices;
   modulating means for providing gradual rises in fluid pressure to the selected speed drive engaging device and the selected directional drive engaging device; and
   a differential check and safety valve;
   the differential check and safety valve further comprising:
   a housing defining a bore;
   a spool member slidably contained in said bore, said spool member having a first end and a second opposite end and defining a first axial bore in the first end and a second axial bore in the opposite end;
   a floating sleeve member slidably contained in the first axial bore defined at the first end of the spool member, said sleeve member having a cylindrical projection extending beyond the end of the spool member; the spool member slidably urged to a first position by first and second resilient means, the second resilient means being of relatively lesser strength, the first resilient means positioned within the first axial bore engaging the spool member at one end and the sleeve member at the other end, the second resilient means engaging the sleeve member at one end and the housing at the other end; the sleeve member urged in the same first direction by the second resilient means and urged in a second opposite direction by the first resilient means; the housing having a first inlet communicating with a first inlet groove and a second inlet communicating with a second inlet groove, the second inlet also communicating with the modulating means; the housing also having a first outlet groove, interposed between the first inlet groove and the second inlet groove, said first outlet groove communicating through the directional valve to one of the drive engaging devices; the housing further having a second outlet groove located on the other side of the first inlet groove from the first outlet groove, said second outlet groove vented through the directional valve means when the directional valve has energized one of the drive engaging devices; the housing also having a first drain groove located on the opposite side of the second inlet groove from the first outlet groove; the spool member further defining radial ports communicating the first outlet groove with the first axial bore; said spool member when in its first position engaging the end of the housing nearest the second outlet, simultaneously blocking the second inlet while forming passage means, said passage means providing communication from the first inlet groove to the second axial bore, the spool member further defining radial passages of larger dimension than said passage means, said radial passages communicating the second axial bore with the second outlet groove when the spool member is urged to its first position; and
   means for urging said spool member toward a second position, said spool member when urged toward said second position forming a first cavity, closing the second outlet groove and causing the sleeve member to engage the end of the housing closing the first axial bore from the first drain groove.

2. The combination set forth in claim 1 wherein the means for urging the spool member toward a second position comprises fluid pressure supplied to the first inlet groove while a directional valve means is positioned to select none of the directional drive engaging devices.

3. The combination set forth in claim 2 wherein the passage means from the first inlet groove to the second axial bore comprises a metering groove defined by the spool member and an orificed radial passage communicating said metering groove with the second axial bore.

4. The combination set forth in claim 3 wherein the spool member of the differential check and safety valve when urged to said second position further comprises means to communicate the second inlet to the first drain passage and further provides means for direct communication between the first inlet groove and the first outlet groove said means for direct communication comprising the metering groove defined in the spool member.

5. The combination set forth in claim 4 wherein the differential check and safety valve further comprises means for providing a lower fluid pressure to the directional drive engaging device than the speed engaging device, said means comprising fluid pressure supplied to the first inlet groove while the spool member is in its second position and communicated to the first axial bore by the radial ports, said fluid pressure communicated to the first axial bore supplementing the first resilient means and urging the spool member in the direction of but not reaching said first position to a third position where fluid pressure being introduced to the first axial bore is balanced in a predetermined relation by the fluid pressure urging the spool member in the second direction, said fluid pressure in the first inlet groove being metered to the first outlet groove by the metering groove and the edge of the first outlet groove.

6. The combination set forth in claim 1 further comprising means for venting the first cavity of the differential check and safety valve upon receipt by said means of an external signal; said venting of the first cavity causing the first and second resilient means to urge the spool member sufficiently toward the first position to disengage the sleeve from the end of the housing and vent the first axial bore to drain while still blocking the second outlet.

* * * * *